United States Patent
Chu et al.

(10) Patent No.: US 11,146,390 B2
(45) Date of Patent: Oct. 12, 2021

(54) SYSTEM AND METHOD FOR CONTROLLING ACCESS TO ENCRYPTED VEHICULAR DATA

(71) Applicant: Huawei International Pte. Ltd., Singapore (SG)

(72) Inventors: Cheng Kang Chu, Singapore (SG); Zhuo Wei, Singapore (SG); Chengfang Fang, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 314 days.

(21) Appl. No.: 16/399,351

(22) Filed: Apr. 30, 2019

(65) Prior Publication Data

US 2019/0260580 A1    Aug. 22, 2019

Related U.S. Application Data

(63) Continuation of application No. PCT/SG2017/050542, filed on Oct. 30, 2017.

(30) Foreign Application Priority Data

Oct. 31, 2016    (SG) .......................... 10201609090X

(51) Int. Cl.
*H04L 9/08*    (2006.01)
*G07C 5/00*    (2006.01)
(Continued)

(52) U.S. Cl.
CPC .......... *H04L 9/0836* (2013.01); *G06F 40/146* (2020.01); *G07C 5/008* (2013.01);
(Continued)

(58) Field of Classification Search
CPC ..... H04L 9/0836; H04L 63/08; H04L 9/0894; H04L 63/061; H04L 9/0847;
(Continued)

(56) References Cited

U.S. PATENT DOCUMENTS

| 8,527,485 B2 | 9/2013 | Marzani et al. |
| 2010/0030423 A1 | 2/2010 | Nathanson |

(Continued)

FOREIGN PATENT DOCUMENTS

| CN | 202394110 U | 8/2012 |
| CN | 104486366 A | 4/2015 |
| CN | 105450645 A | 3/2016 |

OTHER PUBLICATIONS

"Password-authenticated key agreement," Wikipedia, Retrieved from the Internet: https://en.wikipedia.org/wiki/Password-authenticated_key_agreement (Jun. 20, 2019).

(Continued)

*Primary Examiner* — Joseph P Hirl
*Assistant Examiner* — Thomas A Gyorfi
(74) *Attorney, Agent, or Firm* — Leydig, Voit & Mayer, Ltd.

(57) ABSTRACT

A system for controlling access to encrypted vehicular data employs a hierarchical access control method that allows select encrypted vehicular data stored in a cloud server to be accessed by an authorized user in a hierarchical manner whereby the authorized user is then able to decrypt the select encrypted data and all child data associated with the select encrypted data.

16 Claims, 5 Drawing Sheets

(51) Int. Cl.

| | |
|---|---|
| *H03M 7/14* | (2006.01) |
| *H03M 7/30* | (2006.01) |
| *H04L 29/06* | (2006.01) |
| *H04W 4/44* | (2018.01) |
| *G06F 40/146* | (2020.01) |
| *H04W 12/041* | (2021.01) |
| *H04W 12/069* | (2021.01) |

(52) U.S. Cl.
CPC ............ *H03M 7/14* (2013.01); *H03M 7/707* (2013.01); *H04L 9/0847* (2013.01); *H04L 9/0894* (2013.01); *H04L 63/061* (2013.01); *H04L 63/08* (2013.01); *H04W 4/44* (2018.02); *H04W 12/041* (2021.01); *H04W 12/069* (2021.01); *H04L 2463/061* (2013.01)

(58) Field of Classification Search
CPC .......... H04L 2463/061; H04W 12/041; H04W 12/069; H04W 4/44; H04W 4/40; H04W 12/04031; H03M 7/707; H03M 7/14; G06F 40/146; G06F 21/33; G06F 21/44; G07C 5/008
See application file for complete search history.

(56) References Cited

U.S. PATENT DOCUMENTS

| | | | |
|---|---|---|---|
| 2012/0215754 A1 | 8/2012 | Marzani et al. | |
| 2013/0338855 A1* | 12/2013 | Mason | G07C 5/0816 701/2 |
| 2013/0342368 A1* | 12/2013 | Nathanson | G08G 1/0965 340/903 |
| 2014/0273955 A1* | 9/2014 | Oesterling | H04W 12/08 455/411 |
| 2017/0034217 A1* | 2/2017 | Anton | G06F 21/6227 |
| 2017/0180391 A1* | 6/2017 | Hinchliffe | H04L 63/08 |

OTHER PUBLICATIONS

Boneh et al., "Hierarchical Identity Based Encryption with Constant Size Ciphertext," EUROCRYPT 2005, vol. 3493 of Lecture Notes in Computer Science, Springer (May 2005).

Park et al., "RSU-Based Distributed Key Management (RDKM) for Secure Vehicular Multicast Communications," IEEE Journal on Selected Areas in Communications, vol. 29, No. 3, pp. 644-658, Institute of Electrical and Electronics Engineers, New York, New York (Mar. 2011).

* cited by examiner

SYSTEM AND METHOD FOR CONTROLLING ACCESS TO ENCRYPTED VEHICULAR DATA

CROSS-REFERENCE TO RELATED APPLICATIONS

This application is a continuation of International Application No. PCT/SG2017/050542, filed on Oct. 30, 2017, which claims priority to Singaporean Patent Application No. 10201609090X, filed on Oct. 31, 2016. The disclosures of the aforementioned applications are hereby incorporated by reference in their entireties.

TECHNICAL FIELD

This application relates to a system and method for controlling access to encrypted vehicular data. In particular, the system employs a hierarchical access control method that allows select encrypted vehicular data stored in a cloud server to be accessed by an authorized user in a hierarchical manner whereby the authorized user is then able to decrypt the select encrypted data and all child data associated with the select encrypted data.

BACKGROUND

Smart vehicles or autonomous vehicles are vehicles that are equipped with an electronic system that is configured to detect the vehicle's operating conditions and surroundings, initiate certain key functions autonomously (e.g. activate or deactivate the vehicle's ignition) and in certain conditions, drive without human intervention. The electronic systems in these types of vehicles typically detect or sense their surroundings using wireless means such as radar, global positioning satellite (GPS), Doppler sonars, or even using image recognition systems with image capturing means. Control systems provided within these electronic systems receive and interpret the detected or captured information to determine navigation paths or more commonly, the data is stored for future diagnostic analysis.

As the smart vehicle would typically be used on a daily basis, the vehicle's electronic systems would amass large volumes of captured and detected data. The data collected would include private information about the vehicle's users such as the users' daily driving habits, the user's home and office addresses, the users' family activity patterns—due to the obtained GPS data, as well as all the vehicle's diagnostic data. All this electronic data are prone to electronic based attacks from hackers or unauthorized users as a compromised electronic system would grant a malicious attacker access to the vehicle as well as personal information about the vehicle's users. Hence, such data is typically secured through various forms of encryption whereby the data may only be decrypted by an authorized user of the vehicle.

When the vehicle is sent to a third party service provider for repairs, maintenance, parking, charging etc., it would be of great use to the service provider's processing of the vehicle if the service provider were able to access the vehicle's diagnostic data or certain functions of the vehicle. As such, the vehicle's user may grant the service provider access to certain stored diagnostic data or the vehicle's user may grant the service provider access to certain vehicle functions, e.g. auto-drive for a fixed period, etc.

A method that is commonly adopted is that the collected data is usually stored in a secure storage within the vehicle. For example, when the vehicle is sent to a service provider for repairs, the service provider is then granted the necessary authorizations to access the stored data. A common method of granting the service provider access to the stored encrypted data would be to provide the service provider with the cryptographic key so that the authorized service provider may decrypt whatever data that they require to carry out their diagnostic operations. The downside of this approach is that as the service provider is provided with the cryptographic key, the service provider is now able to decrypt and download all of the stored data, including private information about the users of the vehicle.

To prevent this from happening, it has been proposed that the data be individually encrypted according to the type of data and the time the data was collected. For example, data relating the operation of the vehicle's engine could be collected on a daily basis and this data is then subjected to a daily encryption. The downside of such an approach is that if the service provider wishes to obtain information about the engine over a particular number of days, e.g. 30 days, the vehicle's owner would then have to provide the service provider with a large number of cryptographic keys corresponding to these times, e.g. 30 cryptographic keys corresponding to the appropriate period.

The approaches proposed above include the risk of unintended data leakage; the risk of unauthorized or over-privileged commands being issued and the increased complexity in the management of cryptographic keys. For the above reasons, those skilled in the art are constantly striving to come up with a system and method to control access to encrypted vehicular data whereby an authorized service provider is able to access specific encrypted data in a hierarchical manner.

SUMMARY OF THE APPLICATION

The above and other problems are solved and an advance in the art is made by systems and methods provided by embodiments in accordance with the application.

A first advantage of embodiments of systems and methods in accordance with the application is that the user of the system need only store a single Hierarchical Identity Based Encryption (HIBE) root key which may then be used to generate private data keys for the encryption of data logs and also may be used to generate parent private keys which may be used by a third party to derive child keys to decrypt child cipher-text. This ensures that the third party would only be able to decrypt child cipher-text originating from a parent private key.

A second advantage of embodiments of systems and methods in accordance with the application is that the private keys used to decrypt data logs need not be stored in a local device as these key may be generated on demand using a root key.

A third advantage of embodiments of systems and method in accordance with the application is that the vehicle's user may securely transfer the root key from the vehicle to the user's mobile device thereby enabling the user to issue private parent keys for third party service providers.

The above advantages are provided by embodiments of a method in accordance with the application operating in the following manner.

According to a first aspect of the application, a system for controlling access to vehicular data comprises a vehicle device configured to: collect vehicular data of a vehicle, wherein each vehicular data is tagged to an identity, wherein each identity is represented as a node on a nodular tree structure, whereby the nodular tree structure includes a root node associated with the vehicle; encrypt each collected vehicular data using a corresponding child key, wherein each corresponding child key is generated based on a node tagged to each vehicular data and a root key corresponding to the root node; transmit the encrypted vehicular data and their tagged nodes to a cloud server; and the cloud server is configured to: receive and store the encrypted vehicular data and their tagged nodes. The system also includes a service device configured to: send a request to the cloud server, wherein the request includes a time period such that upon receiving the request, the cloud server retrieves encrypted vehicular data having tagged nodes that correspond to the time period; receive the retrieved encrypted vehicular data from the cloud server together with their tagged nodes, wherein each node represents a node on the nodular tree structure; determine a group of sub-nodes that is common to the tagged nodes of the received encrypted vehicular data; request for an aggregated key for the group of common sub-nodes; and generate a child key for each received encrypted vehicular data based on the requested aggregated key and the node tagged to each received encrypted vehicular data, wherein each generated child key is used to decrypt a corresponding encrypted vehicular data.

With reference to the first aspect, in a first possible implementation manner of the first aspect, the nodular tree structure further comprises a first sub-node associated with a class element, a second sub-node associated with a large time unit and a third sub-node associated with a small time unit; wherein a hierarchical relationship of the first, second and third sub-nodes is defined by: the first sub-node being connected to the root node, the second sub-node being connected to the first sub-node, the third sub-node being connected to the second sub-node; whereby each identity is represented as a node on the nodular tree structure by: determining a class element of the collected vehicular data; acquiring a current time comprising a large time unit and a small time unit; identifying a node in the nodular tree structure corresponding to the identity based on the determined class element and the acquired current time.

With reference to the first possible implementation manner of the first aspect, in a second possible implementation manner of the first aspect, the generating of each corresponding child key based on the node tagged to each vehicular data comprises: ascertaining a first sub-node, a second sub-node, and a third sub-node of a node tagged with each collected vehicular data, whereby for each node: generating a first sub-node key using the root key, the first sub-node and the root node; generating a second sub-node key using the first sub-node key, the second sub-node, the first sub-node and the root node; and generating a child key using the third sub-node, the second sub-node, the first sub-node, the root node and the second sub-node key.

With reference to any one of the first aspect, the first or second possible implementation manners of the first aspect, in a third possible implementation manner of the first aspect, the system further comprises a mobile device configured to: retrieve a shared password, whereby the shared password is known to the vehicle device; and encrypt the shared password and communicate the encrypted shared password to the vehicle device to negotiate a shared cryptographic key for establishing secure communications between the mobile device and the vehicle device; and the vehicle device is configured to: encrypt the root key using the shared cryptographic key; and communicate the encrypted root key to the mobile device.

With reference to the third possible implementation manner of the first aspect, in a fourth possible implementation manner of the first aspect, the mobile device is configured to in response to receiving a request for the aggregated key for the group of common sub-nodes, generate the aggregated key for the group of common sub-nodes based on the root key and the hierarchical relationship of sub-nodes in the group of common sub-nodes; and communicate the generated aggregated key to the service device.

With reference to the first aspect, in a fifth possible implementation manner of the first aspect, the vehicle device is configured to in response to receiving a request for the aggregated key for the group of common sub-nodes, generate the aggregated key for the group of common sub-nodes based on the root key and a hierarchical relationship of sub-nodes in the group of common sub-nodes; and communicate the generated aggregated key to the service device.

With reference to the first or fourth possible implementation manners of the first aspect, in a sixth possible implementation manner of the first aspect, the large time unit comprises a unit of time that is larger than a unit of time of the small time unit.

According to a second aspect of the application, a vehicle device is provided in a vehicle for generating encrypted vehicular data, the vehicle device comprising: a processor; and a non-transitory media readable by the processor, the non-transitory media storing instructions that when executed by the processor, cause the processor to: collect vehicular data of the vehicle, wherein each vehicular data is tagged to an identity, wherein each identity is represented as a node on a nodular tree structure, whereby the nodular tree structure includes a root node associated with the vehicle; encrypt each collected vehicular data using a corresponding child key, wherein each corresponding child key is generated based on a node tagged to each vehicular data and a root key corresponding to the root node; and transmit the encrypted vehicular data and their tagged nodes to a cloud server.

With reference to the second aspect, in a first possible implementation manner of the second aspect, the nodular tree structure further comprises a first sub-node associated with a class element, a second sub-node associated with a large time unit and a third sub-node associated with a small time unit; wherein a hierarchical relationship of the first, second and third sub-nodes is defined by: the first sub-node being connected to the root node, the second sub-node being connected to the first sub-node, the third sub-node being connected to the second sub-node; whereby instructions for directing the processor to represent each identity as a node on the nodular tree structure further comprises: for each identity, instructions for directing the processor to: determine a class element of the collected vehicular data; acquire a current time comprising a large time unit and a small time unit; identify a node in the nodular tree structure corresponding to the identity based on the determined class element and the acquired current time.

With reference to the second aspect, in a second possible implementation manner of the second aspect, the instructions for directing the processor to generate each corresponding child key based on the node tagged to each vehicular data comprises: instructions for directing the processor to: whereby for each tagged node, ascertain a first sub-node of the tagged node, a second sub-node of the tagged node, and a third sub-node of the tagged node, generate a first sub-node key using the root key, the first sub-node and the root node; generate a second sub-node key using the first sub-node key, the second sub-node, the first sub-node and the root node; and generate a child key using the third sub-node, the second sub-node, the first sub-node, the root node and the second sub-node key.

With reference to the second aspect, the first or second possible implementation manners of the second aspect, in a third possible implementation manner of the second aspect, the vehicle device further comprises instructions for directing the processor to: in response to receiving a request for the aggregated key for the group of common sub-nodes, generate the aggregated key for the group of common sub-nodes based on the root key and a hierarchical relationship of sub-nodes in the group of common sub-nodes; and communicate the generated aggregated key to the service device.

With reference to the first possible implementation manner of the second aspect, in a fourth possible implementation manner of the second aspect, the large time unit comprises a unit of time that is larger than a unit of time of the small time unit.

According to a third aspect of the application, a service device for controlling access to vehicular data of a vehicle is provided, whereby the vehicular data is collected and tagged to a node in a nodular tree structure, and the vehicular data is encrypted by a vehicle device provided in a vehicle and stored in a cloud server, the service device comprising: a processor; and a non-transitory media readable by the processor, the non-transitory media storing instructions that when executed by the processor, cause the processor to: send a request to the cloud server, wherein the request includes a time period such that upon receiving the request, the cloud server retrieves encrypted vehicular data having tagged nodes that correspond to the time period; receive the retrieved encrypted vehicular data from the cloud server together with their tagged nodes, wherein each node represents a node on the nodular tree structure; determine a group of sub-nodes that is common to the tagged nodes of the received encrypted vehicular data; request for an aggregated key for the group of common sub-nodes; and generate a child key for each received encrypted vehicular data based on the requested aggregated key and the node tagged to each received encrypted vehicular data, wherein each generated child key is used to decrypt a corresponding encrypted vehicular data.

With reference to the third aspect, in a first possible implementation manner of the first aspect, the nodular tree structure further comprises: a first sub-node associated with a class element, a second sub-node associated with a large time unit and a third sub-node associated with a small time unit, wherein a hierarchical relationship of the first, second and third sub-nodes is defined by: the first sub-node being connected to the root node, the second sub-node being connected to the first sub-node, the third sub-node being connected to the second sub-node; whereby instructions for directing the processor to tag each collected vehicular data to a node further comprises: for each node, instructions for directing the processor to: determine a class element of the collected vehicular data; acquire a current time comprising a large time unit and a small time unit; identify a node in the nodular tree structure corresponding to the identity based on the determined class element and the acquired current time.

With reference to the first aspect of the first possible implementation manner of the third aspect, in a second possible implementation manner of the third aspect, the instructions for directing the processor to generate a child key for each received encrypted vehicular data based on the requested aggregated key and the node tagged to each received encrypted vehicular data comprises: for each tagged node, instructions for directing the processor to: generate a first sub-node key for a first sub-node of the tagged node based on the aggregated key, the root node and the first sub-node; generate a second sub-node key for a second sub-node of the tagged node based on the first sub-node key, the root node, the first sub-node and the second sub-node; and generate the child key for the tagged node based on the second sub-node key, the root node, the first sub-node, the second sub-node and a third sub-node of the tagged node.

With reference to the first aspect of the first possible implementation manner of the third aspect, in a third possible implementation manner of the third aspect, the instructions for directing the processor to generate a child key for each received encrypted vehicular data based on the requested aggregated key and the node tagged to each received encrypted vehicular data comprises: for each tagged node, instructions for directing the processor to: generate a second sub-node key for a second sub-node of the tagged node based on the aggregated key, the root node, a first sub-node of the tagged node and the second sub-node; and generate the child key for the tagged node based on the second sub-node key, the root node, the first sub-node, the second sub-node and a third sub-node of the tagged node.

With reference to the first aspect of the first possible implementation manner of the third aspect, in a fourth possible implementation manner of the third aspect, the instructions for directing the processor to generate a child key for each received encrypted vehicular data based on the requested aggregated key and the node tagged to each received encrypted vehicular data comprises: for each tagged node, instructions for directing the processor to: generate the child key for the tagged node based on the aggregated key, the root node, the first sub-node of the tagged node, the second sub-node of the tagged node and the third sub-node of the tagged node.

With reference to the first possible implementation manner of the third aspect, in a fifth possible implementation manner of the third aspect, the large time unit comprises a unit of time that is larger than a unit of time of the small time unit.

According to a fourth aspect of the application, a mobile device for controlling access to vehicular data of a vehicle is provided, whereby each vehicular data is collected and tagged to a node in a nodular tree structure, and the collected vehicular data is encrypted by a vehicle device provided in a vehicle and stored in a cloud server, the mobile device comprising: a processor; and a non-transitory media readable by the processor, the non-transitory media storing instructions that when executed by the processor, cause the processor to: send a request to the cloud server, wherein the request includes a time period such that upon receiving the request, the cloud server retrieves encrypted vehicular data having tagged nodes that correspond to the time period; receive the retrieved encrypted vehicular data from the cloud server together with their tagged nodes, wherein each node represents a node on the nodular tree structure; determine a group of sub-nodes that is common to the tagged nodes of the received encrypted vehicular data; request for an aggregated key for the group of common sub-nodes; and generate a child key for each received encrypted vehicular data based on the requested aggregated key and the node tagged to each received encrypted vehicular data, wherein each generated child key is used to decrypt a corresponding encrypted vehicular data.

With reference to the fourth aspect, in a first possible implementation manner of the fourth aspect, the nodular tree structure further comprises: a first sub-node associated with a class element, a second sub-node associated with a large time unit and a third sub-node associated with a small time unit, wherein a hierarchical relationship of the first, second and third sub-nodes is defined by: the first sub-node being connected to the root node, the second sub-node being connected to the first sub-node, the third sub-node being connected to the second sub-node; whereby instructions for directing the processor to tag each collected vehicular data to a node further comprises: for each node, instructions for directing the processor to: determine a class element of the collected vehicular data; acquire a current time comprising a large time unit and a small time unit; identify a node in the nodular tree structure corresponding to the identity based on the determined class element and the acquired current time.

With reference to the fourth aspect or the first possible implementation manner of the fourth aspect, in a second possible implementation manner of the fourth aspect, the instructions for directing the processor to generate a child key for each received encrypted vehicular data based on the requested aggregated key and the node tagged to each received encrypted vehicular data comprises: for each tagged node, instructions for directing the processor to: generate a first sub-node key for a first sub-node of the tagged node based on the aggregated key, the root node and the first sub-node; generate a second sub-node key for a second sub-node of the tagged node based on the first sub-node key, the root node, the first sub-node and the second sub-node; and generate the child key for the tagged node based on the second sub-node key, the root node, the first sub-node, the second sub-node and a third sub-node of the tagged node.

With reference to the fourth aspect or the first possible implementation manner of the fourth aspect, in a third possible implementation manner of the fourth aspect, the instructions for directing the processor to generate a child key for each received encrypted vehicular data based on the requested aggregated key and the node tagged to each received encrypted vehicular data comprises: for each tagged node, instructions for directing the processor to: generate a second sub-node key for a second sub-node of the tagged node based on the aggregated key, the root node, a first sub-node of the tagged node and the second sub-node; and generate the child key for the tagged node based on the second sub-node key, the root node, the first sub-node, the second sub-node and a third sub-node of the tagged node.

With reference to the fourth aspect or the first possible implementation manner of the fourth aspect, in a fourth possible implementation manner of the fourth aspect, the instructions for directing the processor to generate a child key for each received encrypted vehicular data based on the requested aggregated key and the node tagged to each received encrypted vehicular data comprises: for each tagged node, instructions for directing the processor to: generate the child key for the tagged node based on the aggregated key, the root node, a first sub-node of the tagged node, a second sub-node of the tagged node and a third sub-node of the tagged node.

With reference to the fourth aspect, or any one of the first to fourth possible implementation manners of the fourth aspect, in a fifth possible implementation manner of the fourth aspect, the mobile device further comprises: instructions for directing the processor to: retrieve a shared password from the vehicle device, whereby the shared password is known to the vehicle device; and encrypt the shared password and communicate the encrypted shared password to the vehicle device to negotiate a shared cryptographic key for establishing secure communications between the mobile device and the vehicle device.

With reference to the sixth possible implementation manner of the fourth aspect, in a sixth possible implementation manner of the fourth aspect, the mobile device further comprises instructions for directing the processor to: in response to the request for the aggregated key for the group of common sub-nodes, generate the aggregated key for the group of common sub-nodes based on the root key and the hierarchical relationship of sub-nodes in the group of sub-nodes.

With reference to the first implementation manner of the fourth aspect, in a seventh possible implementation manner of the fourth aspect, the large time unit comprises a unit of time that is larger than a unit of time of the small time unit.

According to a fifth aspect of the application, a method for generating encrypted vehicular data using a vehicle device provided in a vehicle, the method comprising: collecting vehicular data of the vehicle, wherein each vehicular data is tagged to an identity, wherein each identity is represented as a node on a nodular tree structure, whereby the nodular tree structure includes a root node associated with the vehicle; encrypting each collected vehicular data using a corresponding child key, wherein each corresponding child key is generated based on a node tagged to each vehicular data and a root key corresponding to the root node; and transmitting the encrypted vehicular data and their tagged nodes to a cloud server.

With reference to the fifth aspect, in a first possible implementation manner of the fifth aspect, the nodular tree structure further comprises a first sub-node associated with a class element, a second sub-node associated with a large time unit and a third sub-node associated with a small time unit; wherein a hierarchical relationship of the first, second and third sub-nodes is defined by: the first sub-node being connected to the root node, the second sub-node being connected to the first sub-node, the third sub-node being connected to the second sub-node; whereby each identity is represented as a node on the nodular tree structure by: determining a class element of the collected vehicular data; acquiring a current time comprising a large time unit and a small time unit; identifying a node in the nodular tree structure corresponding to the identity based on the determined class element and the acquired current time.

With reference to the fifth aspect or the first possible implementation manner of the fifth aspect, in a second possible implementation manner of the fifth aspect, the generating of each corresponding child key based on the node tagged to each vehicular data comprises: ascertaining a first sub-node, a second sub-node, and a third sub-node of a node tagged with each collected vehicular data, whereby for each tagged node: generating a first sub-node key using the root key, a first sub-node of the tagged node and the root node; generating a second sub-node key using the first sub-node key, a second sub-node of the tagged node, the first sub-node and the root node; and generating a child key using a third sub-node of the tagged node, the second sub-node, the first sub-node, the root node and the second sub-node key.

With reference to the fifth aspect or the first possible implementation manner of the fifth aspect, in a third possible implementation manner of the fifth aspect, the method further comprises: in response to receiving a request for the aggregated key for the group of common sub-nodes, generating the aggregated key for the group of sub-nodes based on the root key and a hierarchical relationship of sub-nodes in the group of common sub-nodes; and communicating the generated aggregated key to the service device.

With reference to the first possible implementation manner of the fifth aspect, in a fourth possible implementation manner of the fifth aspect, the large time unit comprises a unit of time that is larger than a unit of time of the small time unit.

According to a sixth aspect of the application, a method for controlling access to vehicular data of a vehicle, whereby the vehicular data is collected and tagged to a node in a nodular tree structure, and the vehicular data is encrypted by a vehicle device provided in a vehicle and stored in a cloud server, the method using a service device comprising: sending a request to the cloud server, wherein the request includes a time period such that upon receiving the request, the cloud server retrieves encrypted vehicular data having tagged nodes that correspond to the time period; receiving the retrieved encrypted vehicular data from the cloud server together with their tagged nodes, wherein each node represents a node on the nodular tree structure; determining a group of sub-nodes that is common to the tagged nodes of the received encrypted vehicular data; requesting for an aggregated key for the group of common sub-nodes; generating a child key for each received encrypted vehicular data based on the requested aggregated key and the node tagged to each received encrypted vehicular data, wherein each generated child key is used to decrypt a corresponding encrypted vehicular data.

With reference to the sixth aspect, in a first possible implementation manner of the sixth aspect, the nodular tree structure further comprises: a first sub-node associated with a class element, a second sub-node associated with a large time unit and a third sub-node associated with a small time unit, wherein a hierarchical relationship of the first, second and third sub-nodes is defined by: the first sub-node being connected to the root node, the second sub-node being connected to the first sub-node, the third sub-node being connected to the second sub-node; whereby each collected vehicular data is tagged to a node by: determining a class element of the collected vehicular data; acquiring a current time comprising a large time unit and a small time unit; identifying a node in the nodular tree structure corresponding to the identity based on the determined class element and the acquired current time.

With reference to the sixth aspect or the first possible implementation manner of the sixth aspect, in a second possible implementation manner of the sixth aspect, the step of generating a child key for each received encrypted vehicular data based on the requested aggregated key and the node tagged to each received encrypted vehicular data comprises: for each tagged node, generating a first sub-node key for a first sub-node of the tagged node based on the aggregated key, the root node and the first sub-node; generating a second sub-node key for a second sub-node of the tagged node based on the first sub-node key, the root node, the first sub-node and the second sub-node; and generating the child key for the tagged node based on the second sub-node key, the root node, the first sub-node, the second sub-node and a third sub-node of the tagged node.

With reference to the sixth aspect or the first possible implementation manner of the sixth aspect, in a third possible implementation manner of the sixth aspect, the step of generating a child key for each received encrypted vehicular data based on the requested aggregated key and the node tagged to each received encrypted vehicular data comprises: generating a second sub-node key for a second sub-node of the tagged node based on the aggregated key, the root node, a first sub-node of the tagged node and the second sub-node; and generating the child key for the tagged node based on the second sub-node key, the root node, the first sub-node, the second sub-node and a third sub-node of the tagged node.

With reference to the sixth aspect or the first possible implementation manner of the sixth aspect, in a fourth possible implementation manner of the sixth aspect, the step of generating a child key for each received encrypted vehicular data based on the requested aggregated key and the node tagged to each received encrypted vehicular data comprises: generating the child key for the tagged node based on the aggregated key, the root node, a first sub-node of the tagged node, a second sub-node of the tagged node and a third sub-node of the tagged node.

With reference to the first possible implementation manner of the sixth aspect, in a sixth possible implementation manner of the sixth aspect, the large time unit comprises a unit of time that is larger than a unit of time of the small time unit.

According to a seventh aspect of the application, a method for controlling access to vehicular data of a vehicle is provided, whereby the vehicular data is collected and tagged to a node in a nodular tree structure, and the vehicular data is encrypted by a vehicle device provided in a vehicle and stored in a cloud server, the method using a mobile device comprising: sending a request to the cloud server, wherein the request includes a time period such that upon receiving the request, the cloud server retrieves encrypted vehicular data having tagged nodes that correspond to the time period; receiving the retrieved encrypted vehicular data from the cloud server together with their tagged nodes, wherein each node represents a node on the nodular tree structure; determining a group of sub-nodes that is common to the tagged nodes of the received encrypted vehicular data; requesting for an aggregated key for the group of common sub-nodes; generating a child key for each received encrypted vehicular data based on the requested aggregated key and the node tagged to each received encrypted vehicular data, wherein each generated child key is used to decrypt a corresponding encrypted vehicular data.

With reference to the seventh aspect, in a first possible implementation manner of the seventh aspect, the nodular tree structure further comprises: a first sub-node associated with a class element, a second sub-node associated with a large time unit and a third sub-node associated with a small time unit, wherein a hierarchical relationship of the first, second and third sub-nodes is defined by: the first sub-node being connected to the root node, the second sub-node being connected to the first sub-node, the third sub-node being connected to the second sub-node; whereby each collected vehicular data is tagged to a node by: determining a class element of the collected vehicular data; acquiring a current time comprising a large time unit and a small time unit; identifying a node in the nodular tree structure corresponding to the identity based on the determined class element and the acquired current time.

With reference to the first possible implementation manner of the seventh aspect, in a second possible implementation manner of the seventh aspect, the large time unit comprises a unit of time that is larger than a unit of time of the small time unit.

With reference to the seventh aspect, or any one of the first or second possible implementation manners of the seventh aspect, in a third possible implementation manner of the seventh aspect, the method further comprises retrieving a shared password from the vehicle device, whereby the shared password is known to the vehicle device; and encrypting the shared password and communicating the encrypted shared password to the vehicle device to negotiate a shared cryptographic key for establishing secure communications between the mobile device and the vehicle device.

With reference to the third possible implementation manner of the seventh aspect, in a fourth possible implementation manner of the seventh aspect, the method further comprise in response to the request for the aggregated key for the group of common sub-nodes, generate the aggregated key for the group of common sub-nodes based on the root key and the hierarchical relationship of sub-nodes in the group of common sub-nodes.

According to an eighth aspect of the application, a vehicle device provided in a vehicle for generating encrypted vehicular data is provided, the vehicle device comprising a collecting unit, an encrypting unit and a transmitting unit;

the collecting unit is configured to collect vehicular data of the vehicle, wherein each vehicular data is tagged to an identity, wherein each identity is represented as a node on a nodular tree structure, whereby the nodular tree structure includes a root node associated with the vehicle;

the encrypting unit is configured to encrypt each collected vehicular data using a corresponding child key, wherein each corresponding child key is generated based on a node tagged to each vehicular data and a root key corresponding to the root node; and the transmitting unit is configured to transmit the encrypted vehicular data and their tagged nodes to a cloud server.

With reference to the eighth aspect, in a first possible implementation manner of the eighth aspect, wherein the nodular tree structure further comprises a first sub-node associated with a class element, a second sub-node associated with a large time unit and a third sub-node associated with a small time unit;

Wherein a hierarchical relationship of the first, second and third sub-nodes is defined by: the first sub-node being connected to the root node, the second sub-node being connected to the first sub-node, the third sub-node being connected to the second sub-node;

Wherein the vehicle device further comprising a determining unit, an acquiring unit and an identifying unit;

The determining unit is configured to determine a class element of the collected vehicular data;

The acquiring unit is configured to acquire a current time comprising a large time unit and a small time unit;

The identifying unit is configured to identify a node in the nodular tree structure corresponding to the identity based on the determined class element and the acquired current time.

With reference to the eighth aspect, in a second possible implementation manner of the eighth aspect, wherein the vehicle device further comprising a first generating unit;

Whereby for each tagged node, ascertain a first sub-node of the tagged node, a second sub-node of the tagged node, and a third sub-node of the tagged node, the first generating unit is configured to generate a first sub-node key using the root key, the first sub-node and the root node; generate a second sub-node key using the first sub-node key, the second sub-node, the first sub-node and the root node; and generate a child key using the third sub-node, the second sub-node, the first sub-node, the root node and the second sub-node key.

With reference to the eighth aspect or first possible implementation manner of the eighth aspect, or second possible implementation manner of the eighth aspect, in a third possible implementation manner of the eighth aspect, the vehicle further comprising a second generating unit and a communicating unit;

The second generating unit is configured to generate the aggregated key for the group of common sub-nodes based on the root key and a hierarchical relationship of sub-nodes in the group of common sub-nodes in response to receiving a request for the aggregated key for the group of common sub-nodes; and The communicating unit is configured to communicate the generated aggregated key to the service device.

With reference to the first possible implementation manner of the eighth aspect, in a fourth possible implementation manner of the eighth aspect, wherein the large time unit comprises a unit of time that is larger than a unit of time of the small time unit.

According to a ninth aspect of the application, a service device for controlling access to vehicular data of a vehicle is provided, whereby the vehicular data is collected and tagged to a node in a nodular tree structure, and the vehicular data is encrypted by a vehicle device provided in a vehicle and stored in a cloud server, the service device comprising a sending unit, a receiving unit, a determining unit, a requesting unit and a generating unit;

The sending unit is configured to send a request to the cloud server, wherein the request includes a time period such that upon receiving the request, the cloud server retrieves encrypted vehicular data having tagged nodes that correspond to the time period;

The receiving unit is configured to receive the retrieved encrypted vehicular data from the cloud server together with their tagged nodes, wherein each node represents a node on the nodular tree structure;

The determining unit is configured to determine a group of sub-nodes that is common to the tagged nodes of the received encrypted vehicular data;

The requesting unit is configured to request for an aggregated key for the group of common sub-nodes; and The generating unit is configured to generate a child key for each received encrypted vehicular data based on the requested aggregated key and the node tagged to each received encrypted vehicular data, wherein each generated child key is used to decrypt a corresponding encrypted vehicular data.

With reference to the ninth aspect, in a first possible implementation manner of the ninth aspect, wherein the nodular tree structure further comprises:

A first sub-node associated with a class element, a second sub-node associated with a large time unit and a third sub-node associated with a small time unit, Wherein a hierarchical relationship of the first, second and third sub-nodes is defined by: the first sub-node being connected to the root node, the second sub-node being connected to the first sub-node, the third sub-node being connected to the second sub-node;

Wherein the service device further comprises an acquiring unit and an identifying unit, for each node:

The determining unit is configured to determine a class element of the collected vehicular data;

The acquiring unit is configured to acquire a current time comprising a large time unit and a small time unit;

The identify unit is configured to identify a node in the nodular tree structure corresponding to the identity based on the determined class element and the acquired current time.

With reference to the ninth aspect or the first possible implementation manner of the ninth aspect, in a second possible implementation manner of the ninth aspect, for each tagged node:

the generating unit is configured to generate a first sub-node key for a first sub-node of the tagged node based on the aggregated key, the root node and the first sub-node;

the generating unit is further configured to generate a second sub-node key for a second sub-node of the tagged node based on the first sub-node key, the root node, the first sub-node and the second sub-node; and the generating unit is further configured to generate the child key for the tagged node based on the second sub-node key, the root node, the first sub-node, the second sub-node and a third sub-node of the tagged node.

With reference to the ninth aspect or the first possible implementation manner of the ninth aspect, in a third possible implementation manner of the ninth aspect, for each tagged node:

The generating unit is further configured to generate a second sub-node key for a second sub-node of the tagged node based on the aggregated key, the root node, a first sub-node of the tagged node and the second sub-node; and The generating unit is further configured to generate the child key for the tagged node based on the second sub-node key, the root node, the first sub-node, the second sub-node and a third sub-node of the tagged node.

With reference to the ninth aspect or the first possible implementation manner of the ninth aspect, in a fourth possible implementation manner of the ninth aspect, The generating unit is further configured to generate the child key for the tagged node based on the aggregated key, the root node, the first sub-node of the tagged node, the second sub-node of the tagged node and the third sub-node of the tagged node.

With reference to the ninth aspect or the first possible implementation manner of the ninth aspect, in a fifth possible implementation manner of the ninth aspect, wherein the large time unit comprises a unit of time that is larger than a unit of time of the small time unit.

According to a tenth aspect of the application, a mobile device for controlling access to vehicular data of a vehicle is provided, whereby each vehicular data is collected and tagged to a node in a nodular tree structure, and the collected vehicular data is encrypted by a vehicle device provided in a vehicle and stored in a cloud server, the mobile device comprising a sending unit, a receiving unit, a determining unit, a requesting unit and a generating unit;

The sending unit is configured to send a request to the cloud server, wherein the request includes a time period such that upon receiving the request, the cloud server retrieves encrypted vehicular data having tagged nodes that correspond to the time period;

The receiving unit is configured to receive the retrieved encrypted vehicular data from the cloud server together with their tagged nodes, wherein each node represents a node on the nodular tree structure;

The determining unit is configured to determine a group of sub-nodes that is common to the tagged nodes of the received encrypted vehicular data;

The requesting unit is configured to request for an aggregated key for the group of common sub-nodes; and The generating unit is configured to generate a child key for each received encrypted vehicular data based on the requested aggregated key and the node tagged to each received encrypted vehicular data, wherein each generated child key is used to decrypt a corresponding encrypted vehicular data.

With reference to the tenth, in a first possible implementation manner of the tenth aspect, wherein the nodular tree structure further comprises:

a first sub-node associated with a class element, a second sub-node associated with a large time unit and a third sub-node associated with a small time unit, wherein a hierarchical relationship of the first, second and third sub-nodes is defined by: the first sub-node being connected to the root node, the second sub-node being connected to the first sub-node, the third sub-node being connected to the second sub-node;

whereby the mobile device further comprises an identifying unit;

the determining unit is configured to determine a class element of the collected vehicular data;

the acquiring unit is configured to acquire a current time comprising a large time unit and a small time unit;

the identifying unit is configured to identify a node in the nodular tree structure corresponding to the identity based on the determined class element and the acquired current time.

With reference to the tenth aspect or the first possible implementation manner of the tenth aspect, in a second possible implementation manner of the tenth aspect, for each tagged node, The generating unit is configured to generate a first sub-node key for a first sub-node of the tagged node based on the aggregated key, the root node and the first sub-node;

The generating unit is further configured to generate a second sub-node key for a second sub-node of the tagged node based on the first sub-node key, the root node, the first sub-node and the second sub-node; and The generating unit is further configured to generate the child key for the tagged node based on the second sub-node key, the root node, the first sub-node, the second sub-node and a third sub-node of the tagged node.

With reference to the tenth aspect or the first possible implementation manner of the tenth aspect, in a third possible implementation manner of the tenth aspect, for each tagged node, The generating unit is configured to generate a second sub-node key for a second sub-node of the tagged node based on the aggregated key, the root node, a first sub-node of the tagged node and the second sub-node; and The generating unit is further configured to generate the child key for the tagged node based on the second sub-node key, the root node, the first sub-node, the second sub-node and a third sub-node of the tagged node.

With reference to the tenth aspect or the first possible implementation manner of the tenth aspect, in a fourth possible implementation manner of the tenth aspect, for each tagged node, The generating unit is further configured to generate the child key for the tagged node based on the aggregated key, the root node, a first sub-node of the tagged node, a second sub-node of the tagged node and a third sub-node of the tagged node.

With reference to the tenth aspect or the first possible implementation manner of the tenth aspect or the second possible implementation manner of the tenth aspect or the third possible implementation manner of the tenth aspect or the fourth possible implementation manner of the tenth aspect, in a fifth possible implementation manner of the tenth aspect, The mobile device further comprising a retrieving unit and a encrypting unit;

The retrieving unit is configured to retrieve a shared password from the vehicle device, whereby the shared password is known to the vehicle device; and The encrypting unit is configured to encrypt the shared password and communicate the encrypted shared password to the vehicle device to negotiate a shared cryptographic key for establishing secure communications between the mobile device and the vehicle device.

With reference to the fifth possible implementation manner of the tenth aspect, in a sixth possible implementation manner of the tenth aspect, The generating unit is configured to generate the aggregated key for the group of common sub-nodes based on the root key and the hierarchical relationship of sub-nodes in the group of sub-nodes in response to the request for the aggregated key for the group of common sub-nodes.

With reference to the first possible implementation manner of the tenth aspect, in a seventh possible implementation manner of the tenth aspect, wherein the large time unit comprises a unit of time that is larger than a unit of time of the small time unit.

BRIEF DESCRIPTION OF THE DRAWINGS

The above advantages and features in accordance with this application are described in the following detailed description and are shown in the following drawings.

DESCRIPTION OF EMBODIMENTS

This application relates to a system and method for controlling access to encrypted vehicular data. In particular, the system employs a hierarchical access control method that allows select encrypted vehicular data stored in a cloud server to be accessed by an authorized user in a hierarchical manner whereby the authorized user is granted the rights to decrypt the select encrypted parent data and all child data associated with the encrypted parent data by deriving child cryptographic keys for these child data on its own.

One skilled in the art will recognize that many functional units in this description have been labelled as modules throughout the specification. The person skilled in the art will also recognize that a module may be implemented as circuits, logic chips or any sort of discrete component. Further, one skilled in the art will also recognize that a module may be implemented in software which may then be executed by a variety of processors. In embodiments of the application, a module may also comprise computer instructions or executable code that may instruct a computer processor to carry out a sequence of events based on instructions received. The choice of the implementation of the modules is left as a design choice to a person skilled in the art and does not limit the scope of this application in any way.

Figure 1:
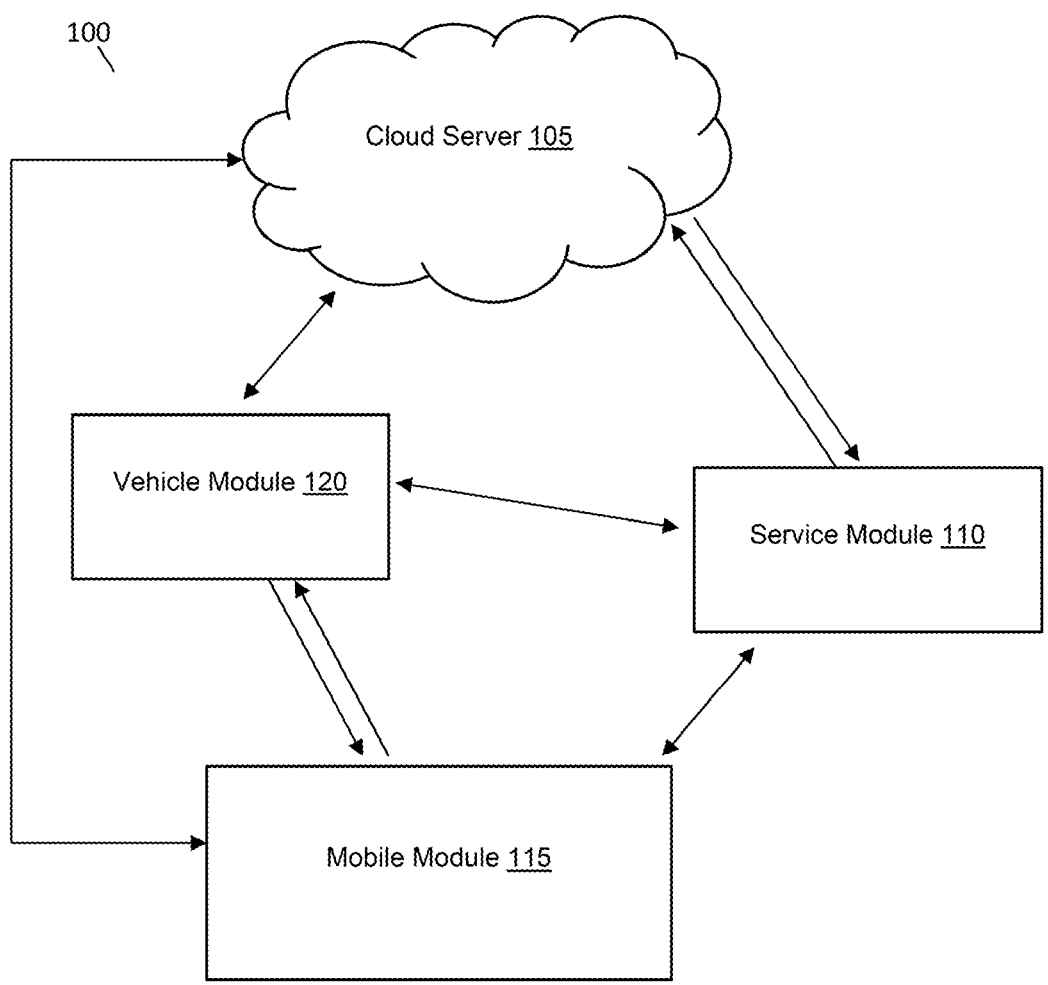
FIG. 1 illustrating a block diagram representative of a system for encrypting vehicular data and authorizing a service provider access to the encrypted data in a hierarchical manner in accordance with embodiments of the application.

FIG. 1 illustrates system 100 for encrypting vehicular data belonging to a smart vehicle and for authorizing a service provider access to the encrypted data in a hierarchical manner in accordance with embodiments of the application. System 100 illustrated in FIG. 1 comprises cloud server 105, service module 110, mobile module 115 and vehicle module 120 that are wirelessly connected to each other. These modules are configured to wirelessly communicate with each other through the Internet or wireless networks such as, but are not limited to, cellular networks, satellite networks, telecommunication networks, or wide area networks (WANs). In addition to the above, vehicle module 120 is also configured to communicate directly with mobile module 115 when mobile module 115 is brought into close physical proximity with vehicle module 120 and this close physical proximity wireless communications may take place through wireless communication means such as, but not limited to, Wireless-Fidelity (Wi-Fi), Bluetooth, or near-field communication (NFC).

Cloud server 105 may comprise a secure cloud server or a remotely located secure server which is able to communicate wirelessly with the various modules of system 100. The main function of cloud server 105 is to act as a secure database for the storage of encrypted data. As such, cloud server 105 need not necessarily be provided with encryption or decryption modules.

Mobile module 115 and service module 110 each may comprise, but is not limited to, an electronic module provided within any device that is able to carry out wireless communication and computing functions such as a smart phone, a tablet computer, a mobile computer, a netbook, a wearable electronic device such as smart watch, and etc. Mobile module 115 may be provided within any electronic device belonging to an owner or an authorized user of the smart vehicle while service module 110 may be provided within any electronic device belonging to an approved third party service provider such as a repair shop mechanic's tablet or a parking attendants' smart mobile device.

Vehicle module 120 may be provided within the smart vehicle's command and control unit which is linked to a plurality of electronic systems. These electronic systems perform the smart functions of the smart vehicle such as the sensing of the vehicle's surroundings, the actuation and deactivation of the vehicle's engine or entertainment systems in response to detected actions, or the autonomous control of the vehicle in response to available data in a predictive or adaptive manner. In most cases, these smart systems include at least sensors for signal acquisition, elements for transmitting the collected and/or received data to the vehicle's command and control unit, components for transmitting decisions and instructions and actuators for performing or triggering required actions.

Figure 2:
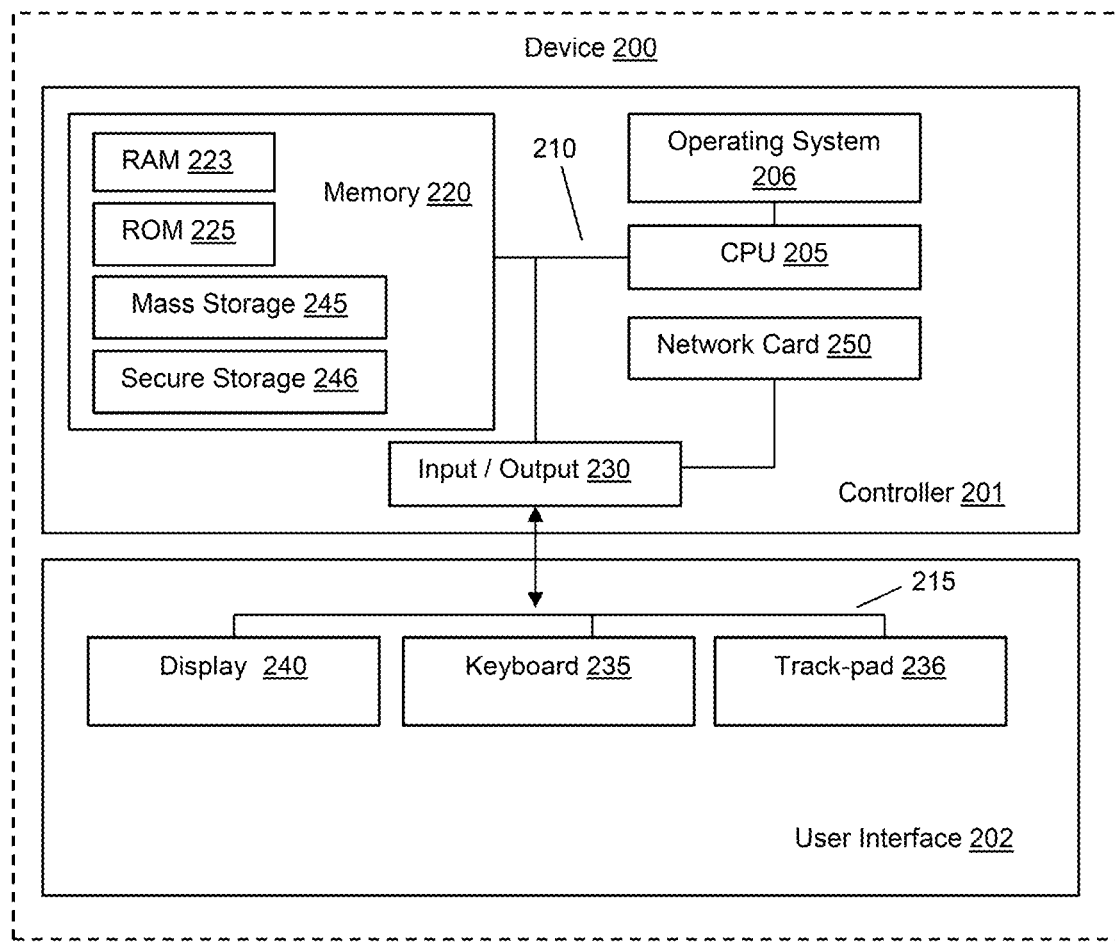
FIG. 2 illustrating a block diagram representative of components in an electronic device or server for implementing embodiments in accordance with embodiments of the application.

FIG. 2 illustrates a block diagram representative of components of an electronic device 200 that is provided within modules 110, 115, and 120 for implementing embodiments in accordance with embodiments of the application. These components may also be provided on a controller connected to cloud server 120. One skilled in the art will recognize that the exact configuration of each electronic device provided within each module or controller may be different and the exact configuration of electronic device 200 may vary and that the layout and configuration of FIG. 2 is provided by way of example only.

In embodiments of the application, device 200 comprises controller 201 and user interface 202. User interface 202 is arranged to enable manual interactions between a user and electronic device 200 and for this purpose includes the input/output components required for the user to enter instructions to control electronic device 200. A person skilled in the art will recognize that components of user interface 202 may vary from embodiment to embodiment but will typically include one or more of display 240, keyboard 235 and track-pad 236.

Controller 201 is in data communication with user interface 202 via bus 215 and includes memory 220, central processor (CPU) 205 mounted on a circuit board that processes instructions and data for performing the method of this embodiment, an operating system 206, an input/output (I/O) interface 230 for communicating with user interface 202 and a communications interface, in this embodiment in the form of a network card 250. Network card 250 may, for example, be utilized to send data from electronic device 200 via a wired or wireless network to other processing devices or to receive data via the wired or wireless network. Wireless networks that may be utilized by network card 250 include, but are not limited to, Wireless-Fidelity (Wi-Fi), Bluetooth, near field communication (NFC), cellular networks, satellite networks, telecommunication networks, wide area networks (WANs) and etc.

Memory 220 and operating system 206 are in data communication with CPU 205 via bus 210. The memory components include both volatile and non-volatile memory and more than one of each type of memory, including random access memory (RAM) 220, read-only memory (ROM) 225 and a mass storage device 245, the last comprising one or more solid-state drives (SSDs). Memory 220 also includes secure storage 246 for securely storing private cryptographic keys such as root keys and/or private keys. It should be noted that the contents within secure storage 246 are only accessible by a super-user or administrator of device 200 and may not be accessed by any simple user of device 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 220 may include a kernel and/or programming modules such as a software application that may be stored in either volatile or non-volatile memory.

It should be noted that the term "CPU" is used to refer generically to any device or component that can process such instructions and may include: a microprocessor, microcontroller, programmable logic device or other computational device. That is, CPU 205 may be provided by any suitable logic circuitry for receiving inputs, processing them in accordance with instructions stored in memory and generating outputs (for example to the memory components or on display 240). In this embodiment, CPU 205 may be a single core or multi-core processor with memory addressable space. In one example, CPU 205 may be multi-core, comprising—for example—an 8 core CPU.

Figure 3:
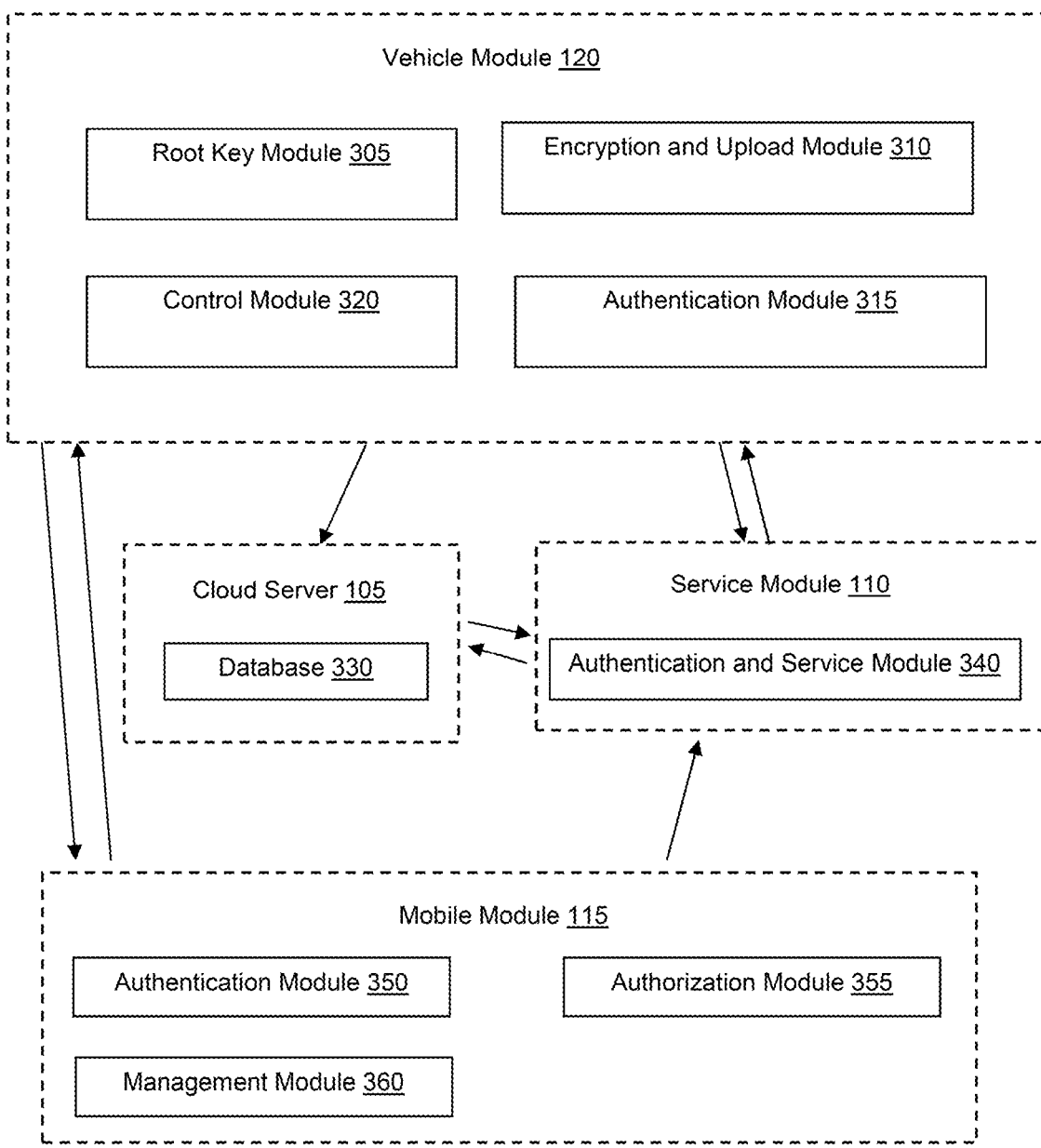
FIG. 3 illustrating a block diagram representative of modules contained in a system for encrypting vehicular data and authorizing a service provider access to the encrypted data in a hierarchical manner in accordance with embodiments of the application.

FIG. 3 illustrates the individual components that may be provided within the modules of system 100 in accordance with embodiments of the application. As mentioned above, vehicle module 120 may be provided within a smart vehicle's command and control unit. As the smart vehicle is used, electronic systems in the smart vehicle will begin to amass all sorts of data logs. For example, data that may be collected include, but are not limited to, data on the vehicle's engine such as the number of engine revolutions per second for the vehicle, the vehicle's speed, the vehicle's GPS locations, the vehicle's tire pressures, the vehicle's fuel consumption, the vehicle's engine temperature, the vehicle's brake fluid level, the vehicle's battery level, images captured by the vehicle's camera and so on.

At predetermined time intervals, all the data logs that are collected will be tagged to a time element whereby the time element represents the time at which the data is tagged or the time element may represent the average time at which the data was collected. The predetermined time intervals may represent a time period of 24 hours, a time period of 7 days, a time period of one month or any other periods of time and is left as a design choice to a person skilled in the art. Each time element may be represented using any type of hierarchical time format such as "Year.Month.Week.Day", "Year.Month.Week", "Year.Month", "Day.Week.Month.Year" or any combination of such hierarchical time formats provided that at least two types of time units are included in the format. The two types of time units comprise a large time unit and a small time unit whereby the large time unit represents a unit of time that is larger than the unit of time represented by the small time unit. For example, a hierarchical time format of "Year. Month" may be adopted as the time element because the "Year" represents the large time unit and the "Month" represents the small time unit. In yet another example, a hierarchical time format of "Year.Month.Week.Day" may be divided into a large time unit that is represented by "Year.Month" while a small time unit may be represented by the "Week.Day". One skilled in the art will recognize that the large time unit may be comprised of any time format combinations as long as the large time unit represents a unit of time that is larger than the unit of time represented by the small time unit. The hierarchical time format may also be represented by a nodular tree structure whereby a root node of the tree structure represents a largest time unit in the hierarchical time format, while child nodes of the tree structure may represent smaller time units. For example, when the hierarchical time format "Year.Month.Week" is represented in a nodular tree structure, the "Year" may be represented by the root node, the "Month" may be represented by a child node branching from the root node and the "Week" may be represented by a further child node branching from the "Month"-child node. As child nodes branch further away from the root node (which is located at the top of the tree structure), these child nodes will move further down the tree structure.

When collected data is tagged to a time element, the type or classification of the data that has been tagged to the time element is then appended to the time element resulting in the formation of an "Identity" that has a format of: "Vehicle.Class.Time_Element" which is similar to that of a node in a nodular tree structure. In this format, "Vehicle" represents the vehicle from which data is collected, "Class" represents the classification or type of data that has been tagged and the "Time Element" represents the time the data was tagged. One skilled in the art will recognize that the root node of the nodular tree structure in this example would be "Vehicle" as all the collected data are related to the "Vehicle" while the "Class" branch represents a child node branching down from the root node, the "Time Element" branch represents a grandchild node branching down from the child node, and that the node for this Identity may be classified in the nodular tree structure as the "Vehicle.Class.Time_Element" node.

For example, assuming that the vehicle's engine speed is collected as the data, this data would then be tagged to an Identity represented by a node on the nodular tree structure as "Vehicle.Engine_Speed.2016.06" whereby the "Vehicle" represents the root node, the "Engine_Speed" represents the "Class" branch and "2016.06" (e.g. "Year.Month" format) represents when the data was tagged whereby this time_element branch is in the hierarchical time format. In this example, the "Engine_Speed" "Class" branch has been appended to the time element to form the Identity. One skilled in the art will recognize that this process may then be repeated for all types of classifications depending on the type of data that has been collected by the vehicle's electronic systems. One skilled in the art will also recognize that the "Class" branch may be appended to time elements having any type of hierarchical time format such as "Year.Month.Week.Day", "Year.Month.Week", "Year.Month", or any combination of such hierarchical time formats provided that at least two types of time units as previously discussed are included in the time format.

Prior to encrypting any data logs, root key module 305 will generate a master or a root key for a Hierarchical Identity Based Encryption (HIBE) scheme. This root key is associated with the root node, which in the example above would be the Vehicle from which the data is collected. This root key is then stored in a secure memory within root key module 305 and is subsequently employed to derive private data keys or child keys for the encryption of collected data logs. The HIBE scheme is an asymmetric encryption scheme that employs a customized hierarchical nodular tree structure. This nodular tree structure may be visualized as a tree with root-parent-child-grandchild and etc. nodes branching downwards (or originating) from a single root node. In this description, one skilled in the art will recognize that a first sub-node in the tree structure refers to a sub-node that is located highest up the tree structure (i.e. nearest to the root node), while a second sub-node in the tree structure refers to a sub-node that branches down from the first sub-node, i.e. at a position that is lower down the tree structure as compared with the first sub-node, and a third sub-node in the tree structure refers to a sub-node that branches down from the second sub-node, i.e. at a position that is lower down the tree structure as compared with the second sub-node. One skilled in the art will also recognize that as the number of a sub-node becomes larger, this implies that the sub-node is located further down the nodular tree structure. Further, a reference made to a node in the nodular tree structure refers to a node that is made up of a hierarchy of sub-nodes. For example, a node at the third sub-node level would be comprised of a root node, a first sub-node, a second sub-node and a third sub-node (i.e. root.first.second.third). As another example, a node at the first sub-node level would be comprised of a root node and a first sub-node (i.e. root.first)

In short, for the encryption process, data or plaintext associated with each node in the tree structure is encrypted using a corresponding child key whereby each corresponding child key is generated based on the node's associated Identity (or position of the node in the nodular tree structure) and the node's child key. As for the decryption process, a root key is used to derive parent keys to decrypt associated parent files and/or associated ciphertext. The parent key may then be used to derive child keys for nodes located further down the tree structure. These child keys are then utilized to decrypt associated child files. This process may then be repeated to decrypt files associated with nodes located further down the tree structure.

It should be noted that this HIBE scheme only allows a downward-decryption process to occur but does not allow an upwards-decryption process to occur. What this means is that a child key may not be used to decrypt an encrypted file which has been encrypted using a private data key associated with the parent's Identity. In other words, a private data key belonging to a lower node may not be used to decrypt an encrypted file located on a higher node, i.e. a node closer to the root node. For example, the identity of a professor may be written as "University. Institute.Department.Name" whereby the identity associated with the root of the tree structure would be the "University". The president of the University would have a root key which may be used to derive keys (i.e. child keys) for all the University's staff including heads of institutes and heads of departments, etc. while the head of the Institute would be able to derive child keys for all the members in his institute including heads of departments (i.e. for nodes further down the tree structure), etc. and the head of the department would be able to derive child keys for all the professors in his department. However, a normal professor belonging to a department (having an Identity "University.Institute.Department.Name") may not utilize his child key associated with his Identity to decrypt material that has been encrypted by his department's head. This is because the head of his department would have encrypted his own materials using his own private data key which was generated based on his own Identity comprising "University. Institute.Department" and the head of department is at a node that higher up the tree structure that the node of the professor (i.e. the professor would be holding a child key while the head of department would have a parent key). Therefore, a child key belonging to a node further down the tree structure (i.e. the professor's key) may not be used to decrypt materials that have been encrypted using an Identity associated with a higher node (i.e. the head of department's identity). A detailed explanation of the workings of the HIBE scheme as known by those skilled in the art may be found in the publication titled "Hierarchical Identity Based Encryption with Constant Size Ciptertext" by Dan Boneh etc.

Returning to the example illustrated in FIG. 3, at predetermined time intervals, data associated with a Class element will be tagged to the Class element to form an Identity. By default, it shall be understood that the Vehicle element which is the root node is always included as the root of the Identity. To recap, an Identity comprises a Vehicle element (i.e. the root node), a Class element that represents a type of data and a time element that represents the time the data was tagged to the Identity. The Identities with their tagged data logs are then provided to encryption and upload module 310. Module 310 will then proceed to encrypt each data log using a corresponding child key, whereby each corresponding child key is generated based on the Identity tagged to the data log and the previously generated root key.

It can also be said that each corresponding child key can be generated based on the node tagged to each data log and the root key. To recap, each Identity may be represented as a node on the nodular tree structure. Hence, in order to generate a corresponding child key for a node (or Identity) in the nodular tree structure, the applicable sub-nodes of the node tagged with the data log are first ascertained. The child keys are then calculated in a hierarchical descending order using the root key. For example, the applicable sub-nodes of the node tagged with the data log may comprise a first sub-node, a second sub-node, and a third sub-node. In this example, a first sub-node key will first be generated for the first sub-node of the node using the root key, the first sub-node and the root node. Once this is done, a second sub-node key will be generated for the second sub-node of the node using the first sub-node key, the second sub-node, the first sub-node and the root node. Finally, a child key for the node will be generated using the third sub-node, the second sub-node, the first sub-node, the root node and the second sub-node key Encryption and upload module 310 then uploads the encrypted data together with their respective tagged Identities (nodes) to cloud server 105. It is useful to note at this stage that the terms Identities and nodes may be used interchangeably throughout the description without deviating from the application. If vehicle module 120 is unable to establish a wireless connection with cloud server 105 at this stage, vehicle module 120 may store the materials that are to be uploaded until a wireless connection is established with cloud server 105. Once the wireless connection is established, the materials may then be uploaded to cloud server 105.

For example, at an exemplary predetermined time interval, a first Identity or node comprising "Vehicle.Engine_Speed.2016.01.01" may be formed by tagging associated data logs to this Identity and a second Identity or node comprising "Vehicle.Battery_Level.2016.01.01" may similarly be formed by tagging associated data logs to this Identity. It is useful at this stage to recap that for the structure of the first Identity or node, the root node is "Vehicle", the first sub-node is "Engine Speed", the second sub-node may be "2016.01" (as long as it is a larger time unit that the third sub-node) and the third sub-node is "01".

These two Identities with their tagged data logs are then communicated to encryption and upload module 310. Module 310 then proceeds to generate a child key associated with the first Identity using the first Identity (e.g. "Vehicle.Engine_Speed.2016.01.01") and the previously generated root key. This child key is then used to encrypt the data log tagged to the first Identity. The generation of the child key for the first Identity is as follows: A first sub-node key will first be generated using the root key and "Vehicle.Engine_Speed". Once this is done, a second sub-node key will be generated using the first sub-node key and "Vehicle.Engine_Speed.2016.01". Finally, a child key for the first Identity will be generated using "Vehicle.Engine_Speed.2016.01.01" and the second sub-node key.

Similarly, module 310 will proceed to generate a child key associated with the second Identity using the second Identity (e.g. "Vehicle.Battery_Level.2016.01.01") and the previously generated root key. This child key associated with the second Identity is then used to encrypt the data log tagged to the second identity.

In embodiments of the application, the encryption process of an associated data log may be carried out using a standard HIBE encryption function such as "Encrypt("Child Key [Vehicle.Engine_Speed.2016.01.01]".Data Log)". The encrypted data logs together with their respective tagged Identities may then be uploaded from module 310 to cloud server 105. Cloud server 105 will receive the encrypted data together with their tagged Identities and proceed to store all this received material in database 330 which comprises a secure memory within a secure server.

In this exemplary embodiment, it shall be assumed that the subject Vehicle has been installed with vehicle module 120. When a third party service provider wishes to obtain specific data about the Vehicle (over a particular period of time) to carry out various processes or maintenance works, the third party service provider will utilize service module 110 to carry out a data decryption process. Authentication and service module 340 as provided within service module 110 will identify the data that is to be decrypted based on the Identities or nodes tagged to the data as stored in cloud server 105. In particular, module 340 will select Identities or nodes belonging to the Vehicle that have the required Class element and time elements (having at least a large time unit and small time unit) that fall within a required period of time. In other words, module 340 may send a request containing a particular time period of interest to cloud server 105 requesting for encrypted vehicular data having nodes that fall within this time period.

Upon receiving the retrieval request, cloud server 105 will then retrieve all encrypted vehicular data tagged with nodes or Identities that fall within the time period specified in the retrieval request. Cloud server 105 then transmits the retrieved encrypted vehicular data (tagged with identities that fall within the required time period) to module 340. At this stage, it should be recalled that each identity corresponds to a node in the nodular tree structure. Hence, this means that the identities contained within the required time period would all have a common node in the nodular tree structure. In this example, the common node of Identities {"Vehicle.Speed.2016.02.01-Vehicle.Speed.2016.02.28"} is actually "Vehicle.Speed.2016.02".

From the received nodes or from the received Identities, module 340 will then identify a group of sub-nodes that is common to the received nodes. Module 340 then requests for an aggregated key corresponding to this common Identity or group of common sub-nodes from vehicle module 120. It should be noted that the determined common Identity or the common node is contained within the request.

For example, module 340 may identify that the received nodes have a large time unit value that is common to all received nodes. This large time unit value is then used to identify the group of common sub-nodes. The group of common sub-nodes comprising only the Root node, the Class element (the first sub-node) and the identified common large time unit (the second sub-node) will then be transmitted to cloud server 105 as part of the request for the aggregated key.

For a more detailed example, it is assumed that module 340 has retrieved encrypted data about the Vehicle's Speed for a time period comprising the entire month of February in 2016, i.e.: {"Vehicle.Speed.2016.02.01-Vehicle.Speed.2016.02.28"}. The large time unit that is common for all the Identities in this set of retrieved Identities or the time period in which the selected Identities belong is "2016.02" which represents the Year and the Month. In other words, this means that the group of common sub-nodes in this example would be "Vehicle.Speed.2016.02". For completeness, it should be noted that in this example, the small time unit represents the Day. The request for an aggregated key together with the group of common sub-nodes, "Vehicle.Speed.2016.02", is then communicated to vehicle module 120.

The request together with the group of common sub-nodes is received by authentication module 315 provided within vehicle module 120. Authentication module 315 will analyze the request and will then proceed to generate an aggregated key for the group of common sub-nodes based on the root key and a hierarchical relationship of sub-nodes in the group of sub-nodes in accordance with the HIBE scheme. Once the aggregated key has been generated for the group of common sub-nodes, the aggregated key is then communicated from vehicle module 120 to service module 110.

For the example above, the group of common sub-nodes comprises "Vehicle.Speed.2016.02". Hence, the root key and "Vehicle.Speed" will be used to first generate child key kspeed which is associated with the highest non-root node, i.e. "Speed". The child key kspeed and "Vehicle.Speed.2016" is then used to generate a child key for a sequentially lower node, i.e. "2016" which is child key kspeed.2016. This child key kspeed.2016 and "Vehicle.Speed.2016.02" is then in turn used to generate a child key for an even sequentially lower node, i.e. "02" which is child key kspeed.2016.02. This aggregated key kspeed.2016.02 for the group of common sub-nodes "Vehicle.Speed.2016.02" is then communicated from vehicle module 120 to service module 110.

Authentication and service module 340 will then receive and store the aggregated key from authentication module 315. Module 340 then utilizes the received aggregated key and the Identities or nodes tagged to each retrieved encrypted vehicular data to derive child keys for the nodes to decrypt each data log appended to each Identity or node. The decrypted data log may then be analyzed to obtain diagnostic data about the vehicle.

Returning to the earlier example, for the set of Identities between {"Vehicle.Speed.2016.02.01-Vehicle.Speed.2016.02.28"}, this means that the aggregated key kspeed.2016.02 may be utilized by module 340 to generate all the child keys for Identities or nodes contained within this time period whereby the aggregated key and an associated Identity or node is used to generate child keys for each Identity within this set. In this example, this means that the following child keys will be generated: "kspeed.2016.02.01, kspeed.2016.02.02, . . . , kspeed.2016.02.27, kspeed.2016.02.28" using the aggregated key and their associated Identity or node. Each child key may then be used to decrypt each data log tagged to each unique Identity or node in this set.

However, if module 340 intends to obtain specific data about the Vehicle, module 340 will identify the specific data that is to be decrypted based on the Identities tagged to the data as stored in cloud server 105. In this embodiment, module 340 will select the specific Identities having the required Class element and time elements or in other words, module 340 will select the specific nodes in the nodular tree structure that to be decrypted. Module 340 will then transmit a request for specific child keys to vehicle module 120 and this request would include the specific Identities or specific nodes.

For example, let's assume that module 340 intends to obtain specific data tagged to the following set of Identities: {"Vehicle.Speed.2016.02.01"; "Vehicle.Speed.2016.02.02"; "Vehicle.Speed.2016.02.03"; "Vehicle.Speed.2016.02.04"; "Vehicle.Speed.2016.02.06"}. These specific Identities would then be transmitted in a request to vehicle module 120 and the step of determining a common node or common Identity as previously described will be omitted.

The request and the specific Identities or nodes are received by authentication module 315 provided within vehicle module 120. Authentication module 315 will analyze the decryption request and will then proceed to generate a child keys for the received Identities using the previously generated root key and the HIBE scheme. Once the child keys have been generated for the specific Identities or nodes, the child keys are then communicated from vehicle module 120 to service module 110. For the example above, the provided Identities would comprise {"Vehicle.Speed.2016.02.01"; "Vehicle.Speed.2016.02.02"; "Vehicle.Speed.2016.02.03"; "Vehicle.Speed.2016.02.04"; "Vehicle.Speed.2016.02.06"}. Hence, the root key will first be used to generate child key kspeed which is associated with the highest non-root node, i.e. "Speed". The child key kspeed is then used to generate a child key for a sequentially lower node, i.e. "2016" which is child key kspeed.2016. This child key kspeed.2016 is then in turn used to generate a child key for an even sequentially lower node, i.e. "02" which is child key kspeed.2016.02. Child key kspeed.2016.02 is then used to generate child keys for the following sequentially lower nodes, i.e. "01, 02, 03, 04, and 06" which are child keys kspeed.2016.02.01, kspeed.2016.02.02, kspeed.2016.02.03, kspeed.2016.02.04, and kspeed.2016.02.06. Child keys kspeed.2016.02.01, kspeed.2016.02.02, kspeed.2016.02.03, kspeed.2016.02.04, and kspeed.2016.02.06 are then communicated from vehicle module 120 to service module 110.

Authentication and service module 340 will receive and store the child keys for the specific Identities from authentication module 315. The child keys are then utilized with each unique Identity or node to decrypt each data log appended to each Identity. The decrypted data logs may then be analyzed to obtain diagnostic data about the vehicle.

For completeness, it should be noted that if module 340 were to request for encryption data associated with two different sets of Identities (i.e. the "Class" branch comprises two different types, e.g. Speed and Battery), this would result in the transmission of a request for two aggregated keys and two groups of common sub-nodes will be transmitted from service module 110 to vehicle module 120. Authentication module 315 will then analyze the request and will then proceed to generate two unique aggregated keys for the two groups of common sub-nodes using the method described above. Once the aggregated keys have been generated for these two groups of common sub-nodes, the aggregated keys are then communicated from vehicle module 120 to service module 110.

Module 340 will then carry out the similar decryption process whereby for the first set of selected Identities, module 340 will utilize the first aggregated key and the tagged Identity or node for each retrieved encrypted data to derive a child key for each data log within this first set and for the second set of selected Identities, module 340 will utilize the second aggregated key and the tagged Identity for each retrieved data log to derive a child key for each data log within this second set. Each derived child key is then utilized to decrypt a corresponding tagged data log.

In a further embodiment of the application the user of the vehicle may wish to manage the issuance of private keys through the use of his or her mobile device and this may be carried out using mobile module 115. Mobile module 115 is provided within the user's mobile device and comprises authentication module 350, management module 360 and authorization module 365. In order to enable mobile module 115 to issue aggregated keys or authorization codes to third party service providers, the root key has to be first copied from root key module 305 (as provided in vehicle module 120) to mobile module 115. This may be done using a Password Authenticated Key Exchange (PAKE) scheme. In the PAKE scheme, authentication module 350 will first retrieve a predetermined shared password that is known to mobile module 115 and vehicle module 120. For example, the shared password known to both mobile and vehicle modules may be a Quick-Response (QR) code or a digital image. Mobile module 115 may cause the QR code to be displayed on the mobile device's display and the displayed QR code may be captured by a camera connected to vehicle module 120.

Authentication module 350 in mobile module 115 will then encrypt the shared password using standard encryption methods. The encrypted shared password is then communicated from mobile module 115 to vehicle module 120 to negotiate a share cryptographic key for establishing secure communications between vehicle module 120 and mobile module 115. Once this is done, the shared encrypted cryptographic key is then utilized to encrypt the root key from root key module 305. The encrypted root key is then communicated using short range wireless communication methods to mobile module 115 and the encrypted root key is decrypted and stored within authentication module 350.

Once the root key has been stored within authentication module 350, authorization module 355 working in conjunction with authentication module 350 may then perform the functions of upload and encryption module 310 and authentication module 315 as provided in vehicle module 120. In other words, the request for an aggregated key and the group of common sub-nodes may instead be received by authorization module 355 as provided within mobile module 115. Authorization module 355 will analyze the request and will then proceed to generate an aggregated key using the root key as previously described. Once the aggregated key has been generated for the group of common sub-nodes, the aggregated key may then be communicated from mobile module 115 to service module 110 and the decryption process may then take place as previously discussed.

In yet a further embodiment of the application, the third party service provider may be required to control the vehicle for a certain amount of time. For example, if the third party service provider is an automated parking system, the third party service provider has to be granted the required authorizations or privileges to control the vehicle. In order to do so, the user will have to grant the service provider with limited privilege so that the service provider may issue commands to the vehicle for a fixed amount of time. The granting of the limited privilege is initiated when management module 360 utilizes the root key stored within authentication module 350 to derive a signature key for a particular privilege. The Class element is indicated in the key together with the expiry period of the privilege. For example, assume that the signature key comprises "auto-drive.2016.11.03.02.7 pm". This signature key is then sent from module 360 via mobile module 115 to service module 110. Service module 110 may then utilize this signature key to control the required feature of the vehicle. To do so, the signature key may be communicated from service module 110 to vehicle module 120 whereby the authentication module 315 will verify the veracity of the signature key using the root key stored in root key module 305. If authentication module 315 determines that the signature key was indeed issued by the same root key, the authentication module will forward the command contained within the signature key to control module 320. Control module 320 will then cause the command to be carried out by the appropriate electronic system within the vehicle.

In accordance with an embodiment of the application, a method for controlling access to vehicular data of a vehicle, whereby the vehicular data is collected and tagged to a node in a nodular tree structure, and the vehicular data is encrypted by a vehicle module provided in a vehicle and stored in a cloud server comprises a service device or a mobile module executing the following five steps:

Step 1, sending a request to the cloud server, wherein the request includes a time period such that upon receiving the request, the cloud server retrieves encrypted vehicular data having tagged nodes that correspond to the time period;

Step 2, receiving the retrieved encrypted vehicular data from the cloud server together with their tagged nodes, wherein each node represents a node on the nodular tree structure;

Step 3, determining a group of sub-nodes that is common to the tagged nodes of the received encrypted vehicular data;

Step 4, requesting for an aggregated key for the group of common sub-nodes; and

Step 5, generating a child key for each received encrypted vehicular data based on the requested aggregated key and the node tagged to each received encrypted vehicular data, wherein each generated child key is used to decrypt a corresponding encrypted vehicular data.

In order to provide such a system or method, a process is needed for generating aggregated keys for computing child keys for the purposes of decrypting cipher-text that have been encrypted using child keys. The following description and FIGS. 4 and 5 describe embodiments of processes that provide processes in accordance with this application.

Figure 4:
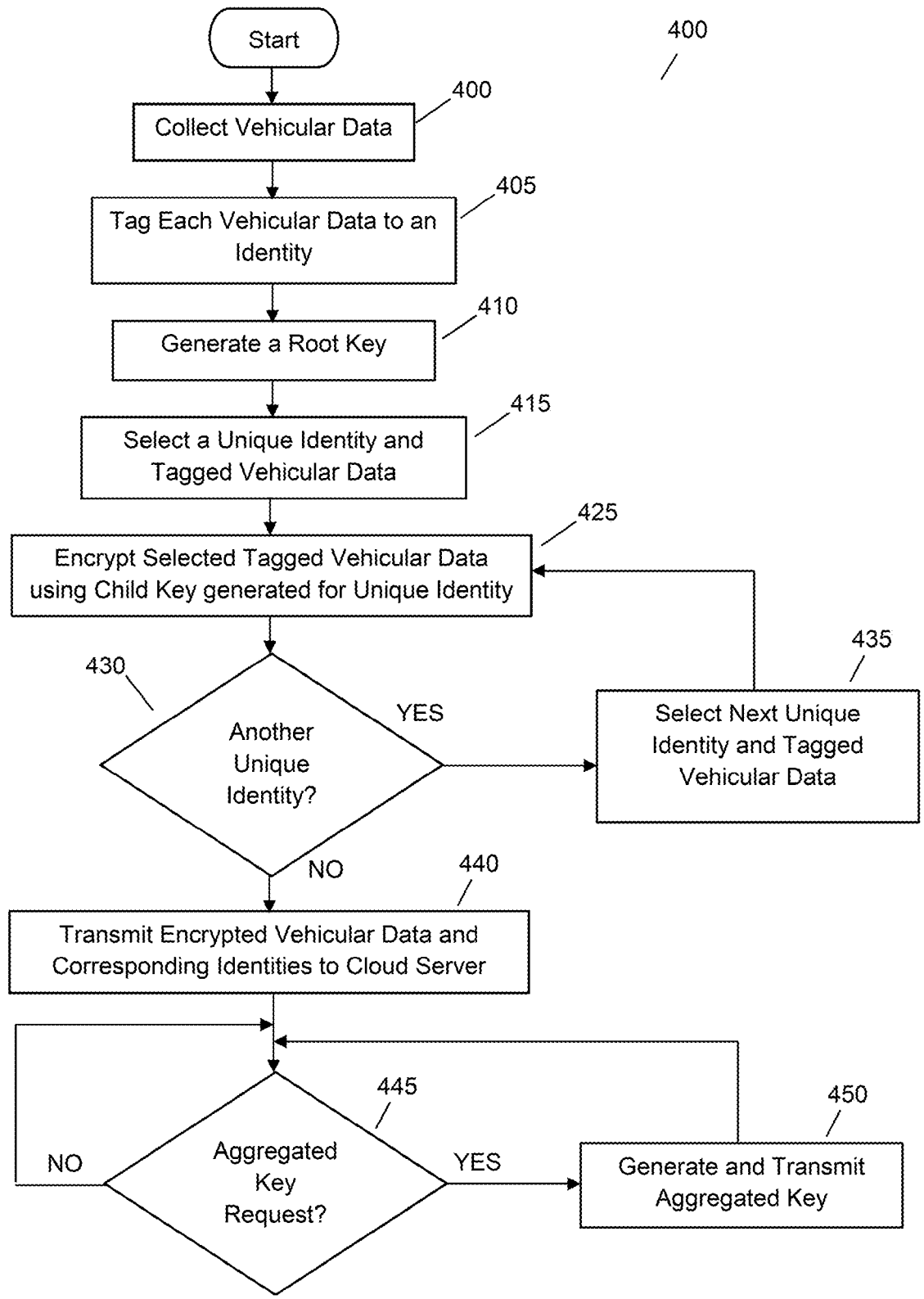
FIG. 4 illustrating a flow diagram of a process in a vehicle module for collecting and encrypting vehicular data in accordance with embodiments of the application.

FIG. 4 illustrates process 400 that is performed by a vehicle module for encrypting tagged data logs and for deriving private keys. Process 400 begins at step 400 with the vehicle module collecting data logs from various electronic systems provided within the smart vehicle. Process 400 then tags the collected data logs to their respective Identities at step 405 whereby each Identity comprises a "Root" branch, a "Class" branch and a "Time" branch in a nodular tree structure format. The "Class" branch represents the type or classification of the data log collected, e.g. vehicle speed, fuel tank level, etc. while the "Time" branch represents the time the data log was tagged to the Identity or an average time at which the data was collected. The "Root" branch is associated with the name or identification of the Vehicle from which data is collected. It should be noted that step 405 may take place at predetermined time intervals and the exact time interval is left as a design choice to a person skilled in the art.

A root key for a HIBE scheme is then derived by process 400 at step 410. The root key is associated with the vehicle. Process 400 then proceeds to select a unique Identity together with its tagged data log at step 415. At step 425, process 400 then encrypts the data log that is tagged to the selected Identity using a root key and a child key computed for the selected Identity based on the HIBE scheme. Process 400 then determines at step 430 whether there is another unique Identity having a tagged data log that has yet to be selected by process 400. If process 400 determines that there is another such unique Identity, process 400 will then proceed to step 435 whereby process 400 then selects the next unique Identity together with its tagged data log. Process 400 then returns to step 425 whereby a child key computed for the selected Identity and the root key is then used with the HIBE scheme to encrypt the tagged data log and process 400 repeats steps 435-430 until all data logs tagged to unique Identities have been processed by process 400, i.e. all data logs have been encrypted.

Process 400 then proceeds from step 430 to step 440 whereby the encrypted vehicular data and their corresponding identities are communicated from the vehicle module to a cloud server. Once this is done, process 400 will then remain in idle mode at step 445 while it waits to receive a request to generate an aggregated key. If process 400 receives a request to generate an aggregated key at step 445, process 400 proceeds to step 450 whereby the root key is utilized with an group of common sub-nodes or specific Identity/node to generate the aggregated key for the group of common sub-nodes or alternatively to generate specific child keys for specific Identities. The aggregated key is then transmitted to the source that generated the request and process 400 returns to its idle mode at step 445.

Figure 5:
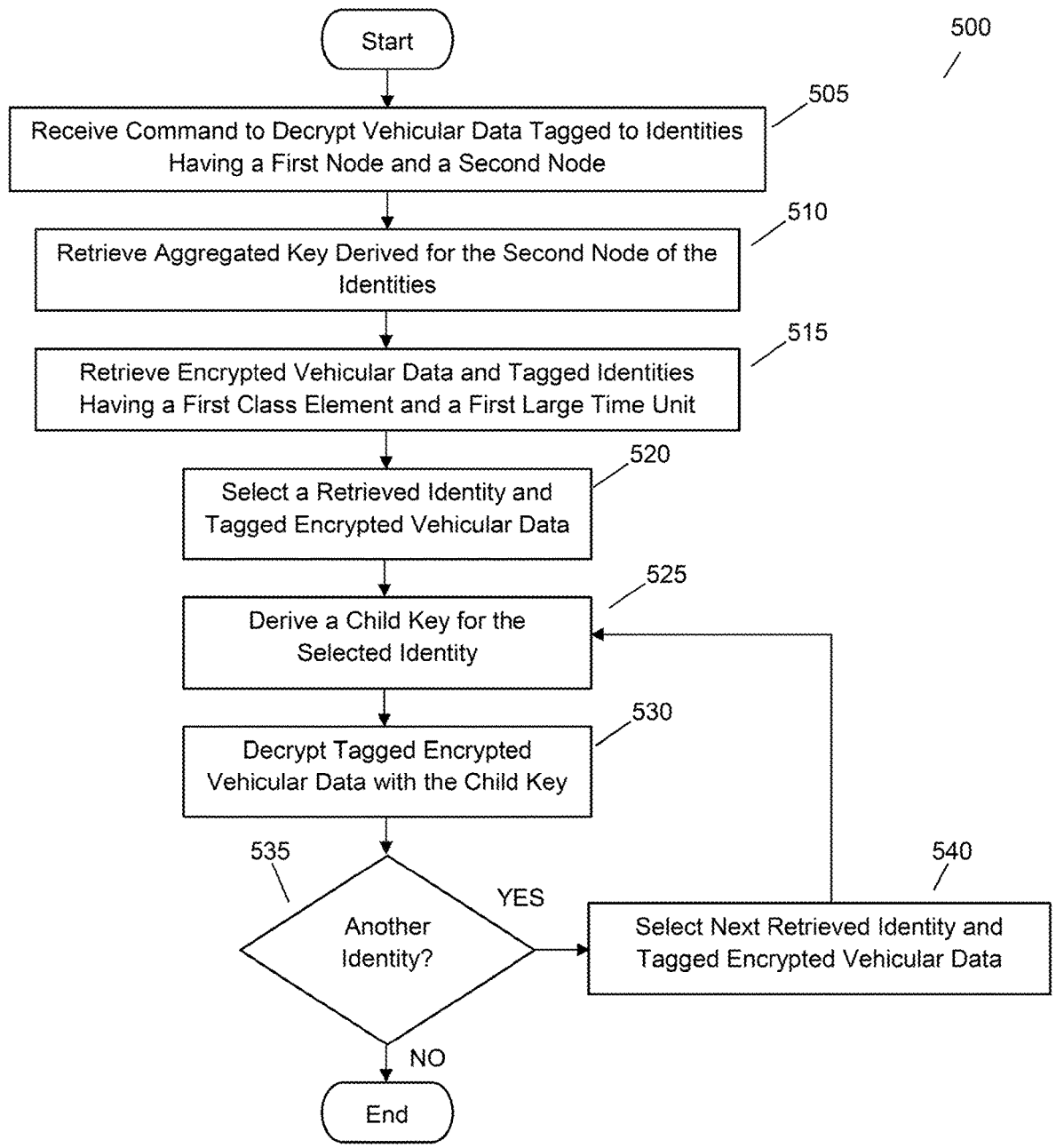
FIG. 5 illustrating a flow diagram of a process in a service module for decrypting select encrypted vehicular data in a hierarchical manner in accordance with embodiments of the application.

FIG. 5 illustrates process 500 that is performed by a service module for retrieving a aggregated key for decrypting select tagged encrypted data logs. Process 500 begins at step 505 whereby process 500 receives a command to decrypt vehicular data tagged to Identities each having a particular class element/branch associated with a first node and each having a particular time period associated with a second node, i.e. identities having a first class element and a first large time unit. Process 500 then proceeds to request for an aggregated key associated with Identities having a particular class element and for a particular period of time, i.e. a common Identity. This request which takes place at step 510 involves process 500 sending the aggregated key request together with the group of common sub-nodes comprising the first class element and the first large time unit to a module having a HIBE scheme root key (e.g. the vehicle module or the mobile module). Once the required aggregated key has been retrieved, process 500 proceeds to step 515. At step 515, the vehicular data tagged to Identities or nodes having a particular class element and for a particular period of time together with their tagged identities are retrieved from the cloud server. It should be noted that step 515 may take place before 510 and these two steps are interchangeable.

Process 500 then proceeds to select a retrieved Identity and a tagged encrypted vehicular data from the set of retrieved materials. This takes place at step 520. Process 500 then proceeds to step 525 whereby process 500 derives a child key for the selected identity using the selected identity and the aggregated key together with the HIBE scheme. The derived child key is then utilized by process 500 at step 530 to decrypt the encrypted data log that is tagged to the selected identity.

Process 500 then checks at step 535 whether there is another retrieved Identity that is tagged to an encrypted data log that has yet to be processed by steps 525 and 530. If process 500 determines that there is another such Identity, process 500 proceeds to step 540 whereby the next Identity together with its tagged encrypted data log is selected. Process 500 then proceeds to step 525 whereby process 500 derives another child key for the selected Identity using the selected Identity and the aggregated key together with the HIBE scheme. The newly derived child key is then utilized by process 500 at step 530 to decrypt the encrypted data log that is tagged to the selected Identity. Process 525-535 repeats itself until all the retrieved Identities and their tagged encrypted data logs have been processed by steps 525 and 530. Process 500 then ends.

The above is a description of embodiments of a system and process in accordance with the present application. It is envisioned that others may and will design alternatives that fall within the scope of the present application.

What is claimed is:

1. A system for controlling access to vehicular data comprising:
    a vehicle device;
    a cloud server; and
    a service device;
    wherein the vehicle device is configured to:
        collect a plurality of pieces of vehicular data of a vehicle, wherein each piece of vehicular data corresponds to an identity, wherein each identity corresponds to a node on a nodular tree structure, and wherein the nodular tree structure includes a root node associated with the vehicle and a plurality of other nodes;
        encrypt each piece of collected vehicular data using a corresponding child key, wherein each corresponding child key is generated based on a respective node corresponding to respective piece of vehicular data and a root key corresponding to the root node; and
        transmit the encrypted pieces of vehicular data and the corresponding nodes to the cloud server;
    wherein the cloud server is configured to: receive and store the encrypted pieces of vehicular data and the corresponding nodes transmitted from the vehicle device;
    wherein the service device is configured to:
        send a request to the cloud server, wherein the request includes a time period;
        receive pieces of encrypted vehicular data with corresponding nodes from the cloud server corresponding to the time period;
        determine a group of sub-nodes that is common to the corresponding nodes of the received pieces of encrypted vehicular data;
        request an aggregated key for the group of common sub-nodes; and
        generate a child key for each received piece of encrypted vehicular data based on the requested aggregated key and the respective node corresponding to the respective received piece of encrypted vehicular data, wherein each generated child key is for decrypting a corresponding piece of encrypted vehicular data.

2. The system according to claim 1, wherein the nodular tree structure further comprises a first sub-node associated with a class element, a second sub-node associated with a large time unit and a third sub-node associated with a small time unit wherein the large time unit corresponds to a unit of time that is larger than a unit of time corresponding to the small time unit;
    wherein a hierarchical relationship of the first, second and third sub-nodes includes: the first sub-node being connected to the root node, the second sub-node being connected to the first sub-node, and the third sub-node being connected to the second sub-node;
    wherein each identity is represented as a node on the nodular tree structure by:
        determining a class element of a respective piece of collected vehicular data;
        acquiring a current time comprising a large time unit and a small time unit; and
        identifying a node in the nodular tree structure corresponding to the identity based on the determined class element and the acquired current time.

3. The system according to claim 2, wherein generating each child key further comprises:
    ascertaining a first sub-node, a second sub-node, and a third sub-node of a respective node corresponding to a respective piece of collected vehicular data;
    generating a first sub-node key using the root key, the first sub-node and the root node;
    generating a second sub-node key using the first sub-node key, the second sub-node, the first sub-node and the root node; and
    generating the child key using the third sub-node, the second sub-node, the first sub-node, the root node and the second sub-node key.

4. The system according to claim 1, further comprising:
    a mobile device configured to:
        retrieve a shared password, wherein the shared password is known to the vehicle device; and encrypt the shared password and communicate the encrypted shared password to the vehicle device to negotiate a shared cryptographic key for establishing secure communications between the mobile device and the vehicle device; and wherein the vehicle device is further configured to:
encrypt the root key using the shared cryptographic key; and
communicate the encrypted root key to the mobile device.

5. The system according to claim 4, wherein the mobile device is further configured to:
in response to receiving a request for the aggregated key for the group of common sub-nodes, generate the aggregated key for the group of common sub-nodes based on the root key and the hierarchical relationship of sub-nodes in the group of common sub-nodes; and
communicate the generated aggregated key to the service device.

6. The system according to claim 1, wherein the vehicle device is further configured to:
in response to receiving a request for the aggregated key for the group of common sub-nodes, generate the aggregated key for the group of common sub-nodes based on the root key and a hierarchical relationship of sub-nodes in the group of common sub-nodes; and
communicate the generated aggregated key to the service device.

7. A vehicle device provided in a vehicle for generating encrypted vehicular data, the vehicle device comprising a processor and a non-transitory memory having instructions stored thereon, wherein the instructions, when executed by the processor, facilitate:
collecting a plurality of pieces of vehicular data of the vehicle, wherein each piece of vehicular data corresponds to an identity, wherein each identity corresponds to a node on a nodular tree structure, wherein the nodular tree structure includes a root node associated with the vehicle;
encrypting each piece of collected vehicular data using a corresponding child key, wherein each corresponding child key is generated based on a respective node corresponding to a respective piece of vehicular data and based on a root key corresponding to the root node; and
transmitting the encrypted pieces of vehicular data and the corresponding nodes to a cloud server.

8. The vehicle device according to claim 7, wherein the nodular tree structure further comprises a first sub-node associated with a class element, a second sub-node associated with a large time unit, and a third sub-node associated with a small time unit, wherein the large time unit corresponds to a unit of time that is larger than a unit of time corresponding to the small time unit;
wherein a hierarchical relationship of the first, second and third sub-nodes includes: the first sub-node being connected to the root node, the second sub-node being connected to the first sub-node, and the third sub-node being connected to the second sub-node;
wherein the instructions, when executed by the processor, further facilitate:
determining a class element of a respective piece of collected vehicular data;
acquiring a current time comprising a large time unit and a small time unit; and
identifying a node in the nodular tree structure corresponding to the identity based on the determined class element and the acquired current time.

9. The vehicle device according to claim 7, wherein generating each corresponding child key further comprises:
ascertaining a first sub-node, a second sub-node, and a third sub-node of a respective node corresponding to a respective piece of collected vehicular data;
generating a first sub-node key using the root key, the first sub-node and the root node;
generating a second sub-node key using the first sub-node key, the second sub-node, the first sub-node and the root node; and
generating the child key using the third sub-node, the second sub-node, the first sub-node, the root node and the second sub-node key.

10. The vehicle device according to claim 9, wherein the instructions, when executed by the processor, further facilitate:
in response to receiving a request for an aggregated key for a group of common sub-nodes, generating the aggregated key for the group of common sub-nodes based on the root key and a hierarchical relationship of sub-nodes in the group of common sub-nodes; and
communicating the generated aggregated key to a service device.

11. A mobile device for controlling access to a plurality of pieces of vehicular data of a vehicle, wherein each piece of vehicular data corresponds to a node in a nodular tree structure, and wherein the plurality of pieces of vehicular data are encrypted by a vehicle device provided in the vehicle and stored in a cloud server, wherein the mobile device comprises a processor and a non-transitory memory having instructions stored thereon, wherein the instructions, when executed by the processor, facilitate:
sending a request to the cloud server, wherein the request includes a time period;
receiving pieces of encrypted vehicular data with corresponding nodes from the cloud server corresponding to the time period;
determining a group of sub-nodes that is common to the corresponding nodes of the received pieces of encrypted vehicular data;
requesting an aggregated key for the group of common sub-nodes; and
generating a child key for each received piece of encrypted vehicular data based on the requested aggregated key and the respective node corresponding to the respective received piece of encrypted vehicular data, wherein each generated child key is for decrypting a corresponding piece of encrypted vehicular data.

12. The mobile device according to claim 11, wherein the nodular tree structure further comprises a first sub-node associated with a class element, a second sub-node associated with a large time unit, and a third sub-node associated with a small time unit, wherein the large time unit corresponds to a unit of time that is larger than a unit of time corresponding to the small time unit;
wherein a hierarchical relationship of the first, second and third sub-nodes includes: the first sub-node being connected to a root node, the second sub-node being connected to the first sub-node, and the third sub-node being connected to the second sub-node;
wherein the instructions, when executed by the processor, further facilitate:
determining a class element of a respective piece of collected vehicular data;

acquiring a current time comprising a large time unit and a small time unit; and identifying a node in the nodular tree structure corresponding to an identity based on the determined class element and the acquired current time.

13. The mobile device according to claim 12, wherein generating each child key comprises:

generating a second sub-node key for a second sub-node of a respective corresponding node based on the aggregated key, the root node, a first sub-node of the respective corresponding node and the second sub-node; and generating the child key for the respective corresponding node based on the second sub-node key, the root node, the first sub-node, the second sub-node and a third sub-node of the respective corresponding node.

14. The mobile device according to claim 11, wherein generating each child key comprises:

generating a first sub-node key for a first sub-node of a respective corresponding node based on the aggregated key, a root node and the first sub-node;

generate a second sub-node key for a second sub-node of the respective corresponding node based on the first sub-node key, the root node, the first sub-node and the second sub-node; and generating the child key for the respective corresponding node based on the second sub-node key, the root node, the first sub-node, the second sub-node and a third sub-node of the respective corresponding node.

15. The mobile device according to claim 11, wherein generating each child key comprises:

generating the child key for a respective corresponding node based on the aggregated key, a root node, a first sub-node of the respective corresponding node, a second sub-node of the respective corresponding node and a third sub-node of the respective corresponding node.

16. The mobile device according to claim 11, wherein the instructions, when executed by the processor, further facilitate:

retrieving a shared password from the vehicle device, wherein the shared password is known to the vehicle device; and encrypting the shared password and communicating the encrypted shared password to the vehicle device to negotiate a shared cryptographic key for establishing secure communications between the mobile device and the vehicle device.

* * * * *

UNITED STATES PATENT AND TRADEMARK OFFICE
CERTIFICATE OF CORRECTION

PATENT NO. : 11,146,390 B2
APPLICATION NO. : 16/399351
DATED : October 12, 2021
INVENTOR(S) : Chu et al.

It is certified that error appears in the above-identified patent and that said Letters Patent is hereby corrected as shown below:

In the Claims

Claim 1: Column 28, Line 4: "corresponding to respective piece of vehicular data" should read
-- corresponding to a respective piece of vehicular data --.

Signed and Sealed this
Twelfth Day of July, 2022

Katherine Kelly Vidal
*Director of the United States Patent and Trademark Office*